(12) United States Patent
Menke

(10) Patent No.: US 8,112,336 B2
(45) Date of Patent: *Feb. 7, 2012

(54) METHOD AND SYSTEM FOR CONVERTING AN ANNUITY FUND TO A LIFE INSURANCE POLICY

(75) Inventor: Robert Menke, Terra Verda, FL (US)

(73) Assignee: Bankers Insurance Group, Inc., St. Petersburg, FL (US)

( * ) Notice: Subject to any disclaimer, the term of this patent is extended or adjusted under 35 U.S.C. 154(b) by 659 days.

This patent is subject to a terminal disclaimer.

(21) Appl. No.: 12/152,519

(22) Filed: May 15, 2008

(65) Prior Publication Data

US 2009/0037231 A1 Feb. 5, 2009

Related U.S. Application Data

(63) Continuation-in-part of application No. 11/975,900, filed on Oct. 22, 2007, which is a continuation of application No. 09/927,748, filed on Aug. 10, 2001, now Pat. No. 7,343,333.

(51) Int. Cl.
*G06Q 40/00* (2006.01)
(52) U.S. Cl. .......................................... 705/35; 705/39
(58) Field of Classification Search .................. None
See application file for complete search history.

(56) References Cited

U.S. PATENT DOCUMENTS 4,969,094 A * 11/1990 Halley et al. ................. 705/36 R
6,950,805 B2 * 9/2005 Kavanaugh ..................... 705/35

* cited by examiner

*Primary Examiner* — Olabode Akintola
(74) *Attorney, Agent, or Firm* — Arthur W. Fisher, III

(57) ABSTRACT

A method and system for converting an annuity fund to a life insurance policy at a predetermined conversion date comprising the following steps: establishing an annuity fund of a predetermined value and purchasing a fixed or variable annuity for the annuity fund, establishing an irrevocable life insurance conversion plan including selecting the predetermined conversion date, selecting a predetermined mortality death benefit at the predetermined conversion date and purchasing a guaranteed insurability option to guarantee the availability of the predetermined mortality death benefit at the predetermined conversion date, accruing investment income within the annuity fund on a tax deferred basis until the predetermined conversion date, converting the annuity fund to the life insurance policy with the predetermined mortality death benefit at the predetermined conversion date, accruing income within the life insurance policy until the death of the insured under the life insurance policy and disbursing the death benefit consisting of mortality insurance and accrued cash values to the beneficiary at the death of the insured under the life insurance policy.

7 Claims, 4 Drawing Sheets

| Policy Year | Beginning of Year Attained Age | Premium | Beginning of Year Fund Before Fees Payout COIs | Beginning of Year Fees | Beginning of Year Fund After Fees | Cash Value Corridor Percentage | Beginning of Year Death Benefit | Beginning of Year Net Amount At Risk (NAR) | Cost of Insurance (COI) Per 1,000 NAR | Beginning of Year COI Charge | Beginning of Year Fund After Fees & COI Charge | Annual Rate of Return | Annual Investment Income | End of Year Annuity Payout | End of Year Fund Value |
|---|---|---|---|---|---|---|---|---|---|---|---|---|---|---|---|
| 1 | 60 | 1,000,000 | 1,000,000 | 12,500 | 987,500 | — | 987,500 | — | — | — | 987,500 | 6.00% | 59,250 | — | 1,046,750 |
| 2 | 61 | | 1,046,750 | 13,084 | 1,033,666 | — | 1,033,666 | — | — | — | 1,033,666 | 6.00% | 62,020 | — | 1,095,686 |
| 3 | 62 | | 1,095,686 | 13,696 | 1,081,989 | — | 1,081,989 | — | — | — | 1,081,989 | 6.00% | 64,919 | — | 1,146,909 |
| 4 | 63 | | 1,146,909 | 14,336 | 1,132,573 | — | 1,132,573 | — | — | — | 1,132,573 | 6.00% | 67,954 | — | 1,200,527 |
| 5 | 64 | | 1,200,527 | 15,007 | 1,185,520 | — | 1,185,520 | — | — | — | 1,185,520 | 6.00% | 71,131 | — | 1,256,651 |
| 6 | 65 | | 1,256,651 | 15,708 | 1,240,943 | — | 1,240,943 | — | — | — | 1,240,943 | 6.00% | 74,457 | — | 1,315,400 |
| 7 | 66 | | 1,315,400 | 16,443 | 1,298,957 | — | 1,296,957 | — | — | — | 1,298,957 | 6.00% | 77,937 | — | 1,376,895 |
| 8 | 67 | | 1,376,895 | 17,211 | 1,359,684 | — | 1,359,804 | — | — | — | 1,359,684 | 6.00% | 81,581 | — | 1,441,265 |
| 9 | 68 | | 1,441,265 | 18,016 | 1,423,249 | — | 1,423,249 | — | — | — | 1,423,249 | 6.00% | 85,395 | — | 1,508,644 |
| 10 | 69 | | 1,508,644 | 18,858 | 1,489,788 | — | 1,489,788 | — | — | — | 1,489,788 | 6.00% | 89,387 | — | 1,579,173 |
| 11 | 70 | | 1,579,173 | 19,740 | 1,559,433 | — | 1,559,433 | — | — | — | 1,559,433 | 6.00% | 93,566 | — | 1,652,999 |
| 12 | 71 | | 1,852,999 | 20,662 | 1,632,337 | — | 1,632,337 | — | — | — | 1,632,337 | 6.00% | 97,940 | — | 1,730,277 |
| 13 | 72 | | 1,730,277 | 21,628 | 1,708,649 | — | 1,708,649 | — | — | — | 1,708,649 | 6.00% | 102,519 | — | 1,811,167 |
| 14 | 73 | | 1,811,167 | 22,640 | 1,788,528 | — | 1,788,528 | — | — | — | 1,788,528 | 6.00% | 107,312 | — | 1,895,840 |
| 15 | 74 | | 1,895,840 | 23,698 | 1,872,142 | — | 1,872,142 | — | — | — | 1,872,142 | 6.00% | 112,328 | — | 1,984,470 |
| 16 | 75 | | 1,984,470 | 24,806 | 1,959,664 | 1.05 | 2,057,647 | 97,983 | 67 | 6,589 | 1,953,075 | 6.00% | 117,184 | — | 2,070,259 |
| 17 | 76 | | 2,070,259 | 25,878 | 2,044,381 | 1.05 | 2,146,600 | 102,219 | 74 | 7,534 | 2,036,847 | 6.00% | 122,211 | — | 2,159,058 |
| 18 | 77 | | 2,159,058 | 26,988 | 2,132,070 | 1.05 | 2,238,674 | 106,604 | 80 | 8,568 | 2,123,502 | 6.00% | 127,410 | — | 2,250,913 |
| 19 | 78 | | 2,250,913 | 28,136 | 2,222,778 | 1.05 | 2,333,915 | 111,139 | 87 | 9,705 | 2,213,071 | 6.00% | 132,784 | — | 2,345,856 |
| 20 | 79 | | 2,345,856 | 29,323 | 2,316,533 | 1.05 | 2,432,358 | 115,827 | 95 | 10,976 | 2,305,557 | 6.00% | 138,333 | — | 2,443,890 |
| 21 | 80 | | 2,443,890 | 30,549 | 2,413,342 | 1.05 | 2,534,008 | 120,667 | 103 | 12,421 | 2,400,920 | 6.00% | 144,055 | — | 2,544,975 |
| 22 | 81 | | 2,544,975 | 31,812 | 2,513,163 | 1.05 | 2,638,821 | 125,658 | 112 | 14,085 | 2,499,078 | 6.00% | 149,945 | — | 2,649,023 |
| 23 | 82 | | 2,649,023 | 33,113 | 2,615,910 | 1.05 | 2,746,706 | 130,796 | 122 | 16,011 | 2,599,899 | 6.00% | 155,994 | — | 2,755,893 |
| 24 | 83 | | 2,755,893 | 34,449 | 2,721,445 | 1.05 | 2,857,517 | 136,072 | 134 | 18,212 | 2,703,233 | 6.00% | 162,194 | — | 2,865,427 |
| 25 | 84 | | 2,865,427 | 35,818 | 2,829,609 | 1.05 | 2,971,088 | 141,480 | 146 | 20,673 | 2,808,936 | 6.00% | 168,536 | — | 2,977,472 |
| 26 | 85 | | 2,977,472 | 37,218 | 2,940,254 | 1.05 | 3,087,266 | 147,013 | 159 | 23,372 | 2,916,881 | 6.00% | 175,013 | — | 3,091,894 |
| 27 | 86 | | 3,091,894 | 38,649 | 3,053,245 | 1.05 | 3,205,908 | 152,862 | 172 | 26,290 | 3,026,955 | 6.00% | 181,617 | — | 3,208,573 |
| 28 | 87 | | 3,208,573 | 40,107 | 3,168,466 | 1.05 | 3,326,869 | 158,423 | 186 | 29,424 | 3,139,042 | 6.00% | 188,343 | — | 3,327,384 |
| 29 | 88 | | 3,327,384 | 41,592 | 3,285,792 | 1.05 | 3,450,082 | 164,290 | 200 | 32,781 | 3,253,011 | 6.00% | 195,181 | — | 3,448,192 |
| 30 | 89 | | 3,448,192 | 43,102 | 3,405,090 | 1.05 | 3,575,344 | 170,254 | 214 | 36,382 | 3,368,708 | 6.00% | 202,122 | — | 3,570,830 |
| 31 | 90 | | 3,570,830 | 44,635 | 3,526,195 | 1.05 | 3,702,505 | 176,310 | 228 | 40,274 | 3,485,921 | 6.00% | 209,155 | — | 3,695,076 |
| 32 | 91 | | 3,695,076 | 46,188 | 3,648,887 | 1.04 | 3,794,843 | 145,856 | 244 | 35,829 | 3,613,258 | 6.00% | 216,795 | — | 3,830,054 |
| 33 | 92 | | 3,830,054 | 47,876 | 3,782,178 | 1.03 | 3,895,843 | 113,465 | 261 | 29,663 | 3,752,615 | 6.00% | 225,151 | — | 3,877,666 |
| 34 | 93 | | 3,877,666 | 49,721 | 3,827,945 | 1.02 | 4,006,504 | 78,559 | 282 | 22,164 | 3,905,781 | 6.00% | 234,347 | — | 4,140,128 |
| 35 | 94 | | 4,140,128 | 51,752 | 4,088,376 | 1.01 | 4,129,260 | 40,884 | 310 | 12,673 | 4,075,704 | 6.00% | 244,542 | — | 4,320,246 |
| 36 | 95 | | 4,320,246 | 54,003 | 4,266,243 | 1.00 | 4,266,243 | — | 352 | — | 4,266,243 | 6.00% | 255,975 | — | 4,522,217 |
| 37 | 96 | | 4,522,217 | 56,526 | 4,465,690 | 1.00 | 4,465,690 | — | 421 | — | 4,465,690 | 6.00% | 267,941 | — | 4,733,631 |
| 38 | 97 | | 4,733,631 | 59,170 | 4,674,461 | 1.00 | 4,674,461 | — | 541 | — | 4,674,461 | 6.00% | 280,468 | — | 4,954,928 |
| 39 | 98 | | 4,954,928 | 61,837 | 4,892,892 | 1.00 | 4,892,892 | — | 745 | — | 4,892,892 | 6.00% | 293,580 | — | 5,186,571 |
| 40 | 99 | | 5,186,571 | 64,832 | 5,121,739 | 1.00 | 5,121,739 | — | 1,000 | — | 5,121,739 | 6.00% | 307,304 | — | 5,429,043 |

FIG. 3

| Policy Year | Beginning of Year Attained Age | Premium | Beginning of Year Fund Before Fees Payout COIs | Beginning of Year Fees | Beginning of Year Fund After Fees | Cash Value Corridor Percentage | Beginning of Year Death Benefit | Beginning of Year Net Amount At Risk (NAR) | Cost of Insurance (COI) Per 1,000 NAR | Beginning of Year COI Charge | Beginning of Year Fund After Fees & COI Charge | Annual Rate of Return | Annual Investment Income | End of Year Annuity Payout | End of Year Fund Value |
|---|---|---|---|---|---|---|---|---|---|---|---|---|---|---|---|
| 1 | 60 | 1,000,000 | 1,000,000 | 12,500 | 987,500 | | 987,500 | | | | 987,500 | -1.00% | 69,125 | | 1,056,625 |
| 2 | 61 | | 1,058,625 | 13,208 | 1,043,417 | | 1,043,417 | | | | 1,043,417 | 6.00% | 62,605 | | 1,106,022 |
| 3 | 62 | | 1,106,022 | 13,825 | 1,092,197 | | 1,092,197 | | | | 1,092,197 | 5.00% | 54,610 | | 1,146,807 |
| 4 | 63 | | 1,146,807 | 14,335 | 1,132,472 | | 1,132,472 | | | | 1,132,472 | 4.50% | 50,961 | | 1,183,433 |
| 5 | 64 | | 1,183,433 | 14,793 | 1,168,640 | | 1,168,640 | | | | 1,168,640 | 8.00% | 93,491 | | 1,262,131 |
| 6 | 65 | | 1,262,131 | 15,777 | 1,246,355 | | 1,246,355 | | | | 1,246,355 | 8.50% | 105,940 | | 1,352,295 |
| 7 | 66 | | 1,352,295 | 16,904 | 1,335,391 | | 1,335,391 | | | | 1,335,391 | 1.00% | 13,354 | | 1,348,745 |
| 8 | 67 | | 1,348,745 | 16,859 | 1,331,886 | | 1,331,886 | | | | 1,331,886 | 2.00% | 26,638 | | 1,358,523 |
| 9 | 68 | | 1,358,523 | 16,982 | 1,341,542 | | 1,341,542 | | | | 1,341,542 | 6.00% | 80,493 | | 1,422,034 |
| 10 | 69 | | 1,422,034 | 17,775 | 1,404,259 | | 1,404,259 | | | | 1,404,259 | 5.00% | 70,213 | | 1,474,472 |
| 11 | 70 | | 1,474,472 | 18,431 | 1,456,041 | | 1,456,041 | | | | 1,456,041 | 4.00% | 58,242 | | 1,514,283 |
| 12 | 71 | | 1,514,283 | 18,929 | 1,495,354 | | 1,495,354 | | | | 1,495,354 | 8.00% | 119,628 | | 1,614,982 |
| 13 | 72 | | 1,614,982 | 20,187 | 1,594,795 | | 1,594,795 | | | | 1,594,795 | 7.00% | 111,636 | | 1,706,431 |
| 14 | 73 | | 1,706,431 | 21,330 | 1,685,100 | | 1,685,100 | | | | 1,685,100 | 3.00% | 50,553 | | 1,735,653 |
| 15 | 74 | | 1,735,653 | 21,696 | 1,713,958 | | 1,713,958 | | | | 1,713,958 | 5.00% | 85,698 | | 1,799,656 |
| 16 | 75 | | 1,799,656 | 22,498 | 1,777,160 | 1.05 | 1,866,018 | 88,858 | 67 | 5,976 | 1,771,184 | 6.00% | 106,271 | | 1,877,455 |
| 17 | 76 | | 1,877,455 | 23,468 | 1,853,987 | 1.05 | 1,946,686 | 92,699 | 74 | 6,832 | 1,847,155 | 7.00% | 129,301 | | 1,976,456 |
| 18 | 77 | | 1,976,456 | 24,706 | 1,951,750 | 1.05 | 2,049,338 | 97,588 | 80 | 7,843 | 1,943,907 | 3.50% | 68,037 | | 2,011,944 |
| 19 | 78 | | 2,011,944 | 25,148 | 1,986,795 | 1.05 | 2,086,134 | 99,340 | 87 | 8,674 | 1,978,120 | 4.00% | 79,125 | | 2,057,245 |
| 20 | 79 | | 2,057,245 | 25,716 | 2,031,530 | 1.05 | 2,133,106 | 101,576 | 95 | 9,625 | 2,021,904 | 7.00% | 141,533 | | 2,163,437 |
| 21 | 80 | | 2,163,437 | 27,043 | 2,136,394 | 1.05 | 2,243,214 | 106,820 | 103 | 10,990 | 2,125,398 | 6.50% | 138,151 | | 2,263,549 |
| 22 | 81 | | 2,263,549 | 28,294 | 2,235,255 | 1.05 | 2,347,018 | 111,763 | 112 | 12,527 | 2,222,727 | 7.00% | 155,591 | | 2,378,318 |
| 23 | 82 | | 2,378,318 | 29,729 | 2,348,589 | 1.05 | 2,466,019 | 117,429 | 122 | 14,375 | 2,334,215 | 6.70% | 156,392 | | 2,490,607 |
| 24 | 83 | | 2,490,607 | 31,133 | 2,459,475 | 1.05 | 2,582,448 | 122,974 | 134 | 16,459 | 2,443,016 | 5.60% | 136,808 | | 2,579,825 |
| 25 | 84 | | 2,579,825 | 32,248 | 2,547,577 | 1.05 | 2,674,956 | 127,379 | 146 | 18,613 | 2,528,964 | 4.50% | 113,803 | | 2,642,768 |
| 26 | 85 | | 2,642,768 | 33,035 | 2,609,733 | 1.05 | 2,740,220 | 130,487 | 159 | 20,745 | 2,588,988 | 5.50% | 142,394 | | 2,731,383 |
| 27 | 86 | | 2,731,383 | 34,142 | 2,697,240 | 1.05 | 2,832,103 | 134,862 | 172 | 23,225 | 2,674,016 | 3.50% | 93,591 | | 2,767,606 |
| 28 | 87 | | 2,767,606 | 34,595 | 2,733,011 | 1.05 | 2,869,662 | 136,651 | 186 | 25,380 | 2,707,631 | 4.20% | 113,721 | | 2,821,352 |
| 29 | 88 | | 2,821,352 | 35,267 | 2,786,085 | 1.05 | 2,925,389 | 139,304 | 200 | 27,795 | 2,758,289 | 5.30% | 146,189 | | 2,904,479 |
| 30 | 89 | | 2,904,479 | 36,306 | 2,868,173 | 1.05 | 3,011,581 | 143,409 | 214 | 30,645 | 2,837,528 | 7.20% | 204,302 | | 3,041,830 |
| 31 | 90 | | 3,041,830 | 38,023 | 3,003,807 | 1.05 | 3,153,997 | 150,190 | 228 | 34,308 | 2,969,499 | 9.00% | 267,255 | | 3,236,754 |
| 32 | 91 | | 3,236,754 | 40,459 | 3,196,295 | 1.04 | 3,324,148 | 127,852 | 244 | 31,210 | 3,165,085 | 8.50% | 269,032 | | 3,434,117 |
| 33 | 92 | | 3,434,117 | 42,926 | 3,391,190 | 1.03 | 3,492,926 | 101,736 | 261 | 26,597 | 3,364,594 | 2.00% | 67,292 | | 3,431,885 |
| 34 | 93 | | 3,431,885 | 42,899 | 3,388,987 | 1.02 | 3,456,767 | 67,780 | 282 | 19,123 | 3,369,864 | -1.00% | (33,699) | | 3,336,166 |
| 35 | 94 | | 3,336,166 | 41,702 | 3,294,463 | 1.01 | 3,327,408 | 32,945 | 310 | 10,212 | 3,284,252 | 4.70% | 154,360 | | 3,438,611 |
| 36 | 95 | | 3,438,611 | 42,983 | 3,395,629 | 1.00 | 3,395,629 | | 352 | | 3,395,629 | 6.30% | 213,925 | | 3,609,553 |
| 37 | 96 | | 3,609,553 | 45,119 | 3,564,434 | 1.00 | 3,564,434 | | 421 | | 3,564,434 | 5.40% | 192,479 | | 3,756,913 |
| 38 | 97 | | 3,756,913 | 46,961 | 3,709,952 | 1.00 | 3,709,952 | | 541 | | 3,709,952 | 7.00% | 259,697 | | 3,969,649 |
| 39 | 98 | | 3,969,649 | 49,621 | 3,920,028 | 1.00 | 3,920,028 | | 745 | | 3,920,028 | 6.00% | 235,202 | | 4,155,230 |
| 40 | 99 | | 4,155,230 | 51,940 | 4,103,289 | 1.00 | 4,103,289 | | 1,000 | | 4,103,289 | 3.00% | 147,718 | | 4,251,008 |

FIG. 4

METHOD AND SYSTEM FOR CONVERTING AN ANNUITY FUND TO A LIFE INSURANCE POLICY

CROSS REFERENCE

This is a continuation-in-part application of Ser. No. 11/975,900 filed Oct. 22, 2007 which is a continuation of application Ser. No. 09/927,748 filed Aug. 10, 2001, issued on Mar. 11, 2008 as U.S. Pat. No. 7,343,333.

BACKGROUND OF THE INVENTION

1. Field of the Invention

A method and system for converting an annuity fund to a life insurance policy at a predetermined conversion date.

2. Description of the Prior Art

Annuities and life insurance are designed to meet different specific financial planning objectives. Since the Internal Revenue Code can have a significant impact on the realization of a person's particular goals, tax consideration of the tax consequences in the selection and purchase of annuities and/or life insurance is often a compromise.

Investment income from the cash values inside the annuity appreciates on a tax deferred basis. Such annuities have no death benefit other than the return of the current account value. Thus, none of the premium for the annuity is used to purchase mortality insurance. Except for any costs and fees, the entire annuity deposit is available to earn investment income.

Distributions of the investment income to the annuitant are taxed as ordinary income. Upon death, the proceeds of the annuity are income in respect of a decedent and taxed as ordinary income to the estate.

On the other hand, variable universal life insurance policies that qualify under Section 7702 of the U.S. Internal Revenue code have significant tax benefits. In order to qualify within the IRC, not only must the investment meet the diversification requirements identical to the diversification requirements for annuities, but the death benefit in relationship to the premium deposit must first satisfy the Guideline Single Premium (GSP) requirement as statutorily mandated. Otherwise the policy will not qualify as a life insurance policy under Section 7702. The GSP defines maximum premium payable with respect to the initial death benefit. In addition, a cash value corridor that varies by age, between the face amount and the account value must be maintained at all time.

The difference between the initial face amount, as determined by the GSP, and the initial account value is the amount of the mortality insurance established at the time of automatic conversion to the life insurance policy. Since the cash value corridor decreases by age, the required Face Amount in relationship to the account value decreases. Therefore the mortality element as required by Section 7702 decreases as the age of the applicant increases.

To the extent the assets of the life policy are used to purchase mortality insurance, such assets are not available for investment purposes. The younger the person is that is proposed to be the insured life, the greater impact this concern will have on the decision to purchase the life policy.

Significantly, an owner of a life insurance policy can exchange that policy for another life policy or for an annuity without an event of recognition under the U.S. tax laws as a Section 1035 exchange. Similarly, an owner of an annuity can exchange that annuity for another annuity without a tax consequence under Section 1035.

Unfortunately, the owner of an annuity cannot exchange for a life insurance policy without an event of tax recognition under Section 1035. Instead, the annuity holder would be taxed at ordinary rates on the difference between his tax basis in the annuity and the proceeds of the annuity.

Thus, there is need for a method or system that is an annuity at the time of creation, but will convert automatically, and without further election on the part of the owner, into a variable universal life insurance policy at a specified date in the future.

At the time of the conversion from an annuity to a life policy, the amount of mortality insurance will be significantly less than if the product had been a life insurance policy from the outset. Further, there is a build up of investment income with which to pay for the mortality charges.

The reason for the automatic conversion is to avoid the unfavorable tax treatment associated with an exchange of an annuity for a life policy.

Various examples of financial planning methods are found in the prior art as exemplified by the following patent.

U.S. Pat. No. 6,950,805 discloses a system for funding, analyzing and managing life insurance policies funded with annuities relates to a program that administers a method of funding life insurance policies using annuities that are purchased at least in part using borrowed money, using business and trust structures to reduce and/or eliminate tax. This investing can be done either directly by the policy or through the trust and/or other business entity. As an internal investment of the insurance policy the income generated by the annuity and the inside build-up are non-income taxable to the owner of the policy. The resulting death benefits will also be non-income taxable to the beneficiary.

U.S. Pat. No. 6,064,969 describes an investment system including a computer implemented annuity system generating annuity proposals for customers comprising a memory storing customer information input from a customer and annuity information and a processor to retrieve the customer and annuity information from the memory and generate an annuity proposal responsive to the customer and annuity information. According to the annuity system, the annuity proposal includes one of the fixed period installments, life, joint and survivor, joint and contingent and proceeds at interest annuities. The proceeds at interest annuity may also be viewed as a flexible certificate of deposit investment proposal for use by companies providing banking services.

U.S. Pat. No. 4,750,121 teaches a pension benefits system for enrolled employees comprising a trust institution and a life insurer institution where the trust institution receives periodic payments, purchases and retains a life insurance policy from the life insurance institution covering each enrolled employee, invests in available securities, provides specific accurate future projections of periodic benefits, receives all life insurance policy proceeds upon the death of each enrolled employee and distributes all periodic payable benefits.

U.S. Pat. No. 4,969,094 relates to a self-implementing pension benefits system for subscriber employees including a life insurer institution and a lending institution. The life insurer trust institution computes and receives each subscriber employee's periodic payment primarily upon each subscriber employee's age and desired periodic benefits and issues a life insurance policy covering each subscriber employee providing specific accurate future projections of periodic benefits for retirement, death or disability; and distributing all life insurance policy proceeds upon the death of each enrolled employee to the lending institution.

U.S. Pat. No. 6,161,096 describes a method for a deferred award instrument plan by identifying at lease one participant in the deferred award plan, retrieving financial data related to stock options corresponding to the identified participant, computing a spread associated with the retrieved stock options, establishing a trust with the spread, determining whether a life insurance policy has been purchased by the participant, determining whether a split dollar agreement has been executed, monitoring and paying at least one premium for the life insurance policy and notifying the participant that a payment associated with the life insurance policy has been paid.

U.S. Pat. No. 4,969,094 is another example of the prior art.

A study of the prior art illustrates the need for a flexible financial estate program or plan capable of maximizing return on capital that minimizes the tax consequences and associated increased charges.

SUMMARY OF THE INVENTION

The present invention relates to a method and system to establish and administer a plan convertible from an annuity phase and a life insurance phase. Specifically, the plan is designed to optimize the financial benefits of an annuity plan and a life insurance policy with the least or reduced tax consequences to the plan owner and beneficiaries.

The method and system provides a mechanism for managing the plan in the annuity phase and the insurance phase and to automatically convert the annuity plan to a life insurance policy qualified under Section 7702 of the U.S. Internal Revenue Code to satisfy the Guideline Single Premium requirement.

In particular, the method and system comprises establishing an annuity fund of a predetermined or variable value, establishing an irrevocable life insurance conversion plan, accruing fixed or variable investment income within the annuity fund on a tax deferred basis until the predetermined conversion date, converting the annuity fund to a qualified life insurance policy with a predetermined or variable mortality death benefit at the predetermined conversion date, accruing fixed or variable income within the life insurance policy and finally disbursing the death benefit to beneficiary at the death of the insured under the qualified life insurance policy.

The irrevocable life insurance conversion plan includes selecting the predetermined conversion date, selecting a predetermined or variable initial mortality death benefit at the predetermined conversion date and purchasing a guaranteed insurability option to guarantee the availability of the predetermined or variable mortality death benefit at the predetermined conversion date.

Once the annuity fund is converted to the life insurance policy with the predetermined or variable mortality death benefit, income is accrued within the life insurance policy until the death of the insured under the life insurance policy at which time the death benefit is disbursed to the beneficiary. The cost of insurance and guaranteed insurability is determined by the age, sex and health condition including smoking status of the plan owner.

A processor comprising an input means, a storage means, a display means and a processing means including a calculating means is employed to model or create and to administer the convertible plan.

To implement the method and system of the present invention, a plurality of plan parameters including the initial value or amount of the annuity fund, the value or amount of the mortality death benefit and the date for converting from the annuity phase to the insurance phase are selected. The cost of the guaranteed insurability option is also ascertained.

The selectable plan parameters together with cost of the guaranteed insurability option and annual or periodic plan management fee are entered into a data base within the storage means. Of course, the cost of the guaranteed insurability option and periodic plan management fee as well as a table for the corridor required to meet the Guideline Single Premium requirement may be entered and maintained in storage independent of entry and storage of the plurality of plan parameters.

Once the data and values are stored in or entered into the processor, the various values and amounts for the plan during the annuity phase and the life insurance phase can be calculated and displayed either on a CRT or similar device or in printed form. With plan parameters, incremental investment income, cost of the guaranteed insurability option and periodic management fee, the calculating means is capable of calculating or generating the beginning of year fund value, net amount at risk, cost of insurance, either the cost of the guaranteed insurability option during annuity phase or the mortality death benefit cost during life insurance phase, investment income, end of year fund value, corridor data or percentage and total death benefit. Thus, actual value and forecast value of the plan in either phase of either plan can be calculated and displayed.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 3 depicts a model or example of the method and system of the instant invention with an annuity fund having a fixed rate of return.

FIG. 4 depicts a model or example of the method and system of the instant invention with an annuity fund having a variable rate of return.

Similar reference characters refer to similar parts throughout the several views of the drawings.

DETAILED DESCRIPTION OF THE PREFERRED EMBODIMENT

The present invention relates to a method and system for converting an annuity fund to a life insurance policy at a predetermined conversion date. The method and system provides a means to establish and administer a plan convertible from an annuity to a life insurance upon the selection of a plurality of plan parameters by a prospective plan owner. The plurality of plan parameters includes the initial annuity fund deposit, plan issue age or date, conversion age or predetermined conversion date initial death benefit amount and periodic or annual plan management fee. With this data or information and a projected return or periodic incremental investment income the convertible plan can be modeled for the duration of the plan including the annual beginning of year fund value, annual beginning of year net at risk amount, cost of insurance with the cost of the guaranteed insurability option during the annuity phase or the mortality death benefit during the life insurance phase, annual end of year fund value and annual year end death benefit.

In particular, the method and system provides a mechanism for managing the plan in the annuity phase and the insurance phase and to automatically convert the annuity plan to a life insurance policy qualified under Section 7702 of the U.S. Internal Revenue Code to satisfy the Guideline Single Premium requirement.

In particular, the method and system comprises establishing an annuity fund of a predetermined value with either a fixed or variable rate of return, establishing an irrevocable life insurance conversion plan including selecting a predetermined conversion date, selecting a predetermined or variable mortality death benefit at the predetermined conversion date and purchasing a guaranteed insurable option to guarantee the availability of the predetermined or variable mortality death benefit at the predetermined conversion date, accruing investment income within the annuity fund on a tax deferred basis until the predetermined conversion date, converting the annuity fund to a qualified life insurance policy with a predetermined mortality death benefit at the predetermined conversion date and finally disbursing the death benefit to beneficiary at the death of the owner of the qualified life insurance policy.

The irrevocable life insurance conversion plan includes selecting the predetermined conversion date, selecting a predetermined initial mortality death benefit at the predetermined conversion date and purchasing a guaranteed insurability option to guarantee the availability of either the predetermined or variable mortality death benefit at the predetermined conversion date.

Once the annuity fund is converted to the life insurance policy with the predetermined mortality death benefit, income is accrued within the life insurance policy until the death of the insured at which time the death benefit is disbursed to the beneficiary.

Figure 1:
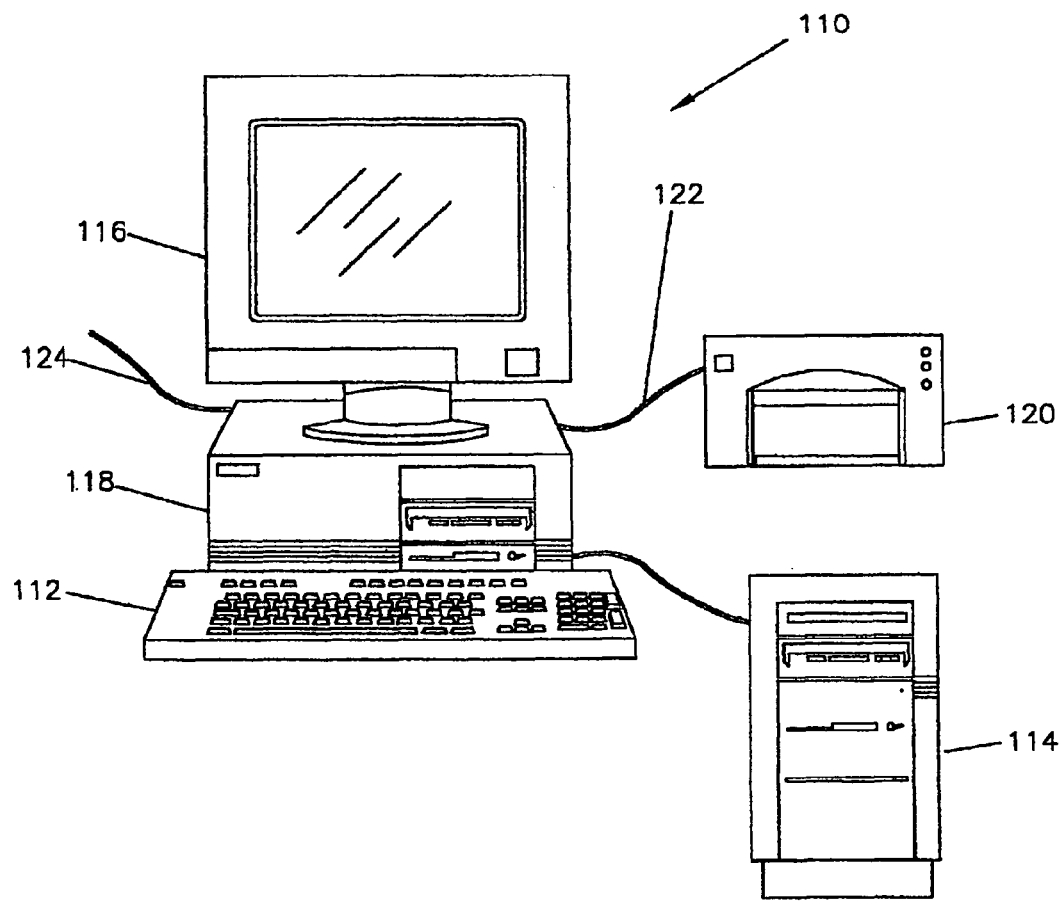
FIG. 1 shows a processor to implement the method and system of the instant invention.

As shown in FIG. 1, a processor generally indicated as 110 comprising an input means or keyboard 112, a hard drive storage means 114, a display means 116 and a processing means 118 including a calculating means and storage is employed to model or create and to administer the convertible plan. The processor 110 is coupled to a printer 120 by a cable 122. Further, the processor 110 may also be operably coupled to an external or remote terminal by communications link 124.

To implement the method and system of the present invention, a plurality of plan parameters including the initial value or amount of the annuity fund, the value or amount of the initial mortality death benefit and the date for converting from the annuity phase to the insurance phase are selected. The cost of the guaranteed insurability option is also ascertained.

The selectable plan parameters together with cost of the guaranteed insurability option and annual or periodic plan management fee are entered into a data base within the storage means. Of course, the cost of the guaranteed insurability option and periodic plan management fee as well as a table for the corridor required to meet the Guideline Single Premium requirement may be entered and maintained in store independent of entry and storage of the plurality of plan parameters.

Figure 2:
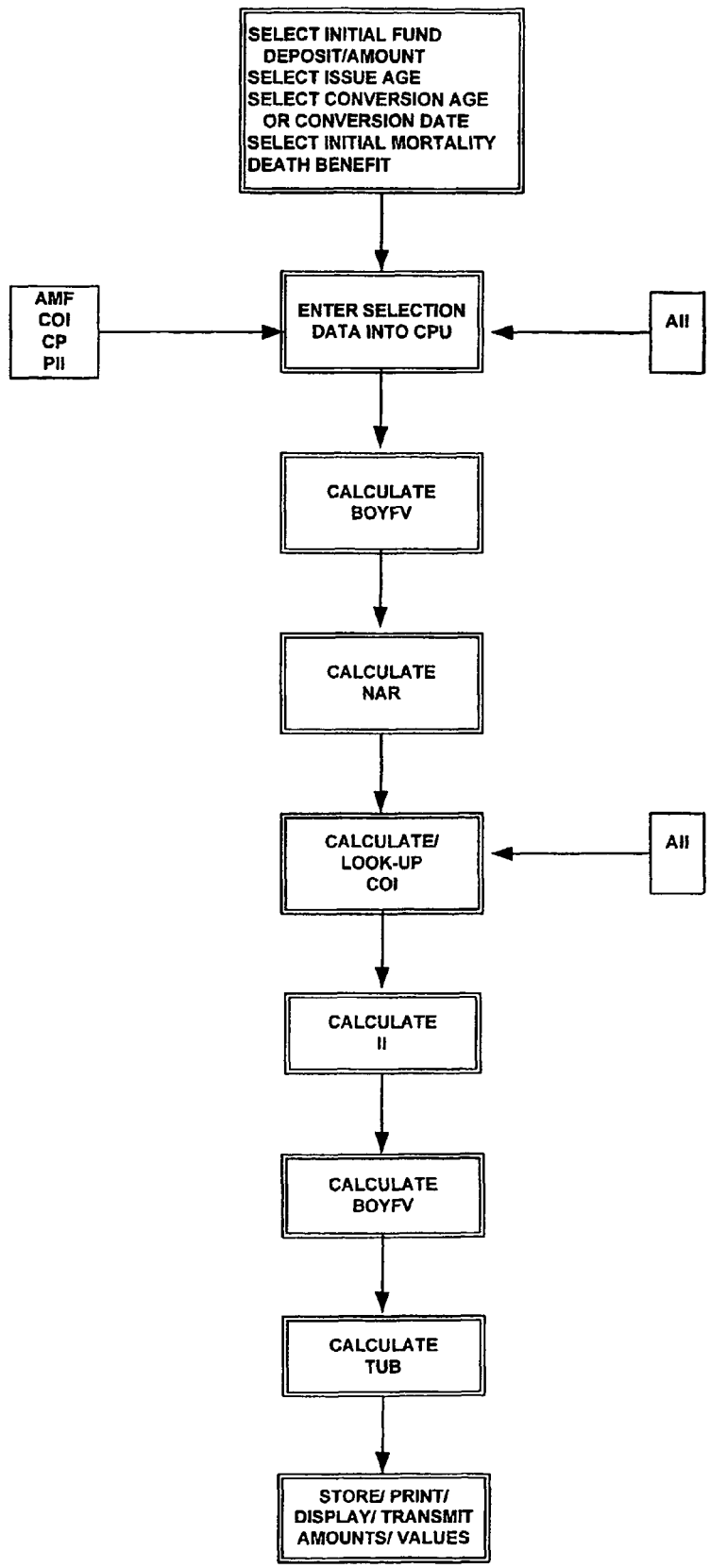
FIG. 2 is a flow chart depicting the method and system of the instant invention.

Once the data and values are stored in processor 110, the various values and amounts for the plan during the annuity phase and the life insurance phase can be calculated as generally depicted in FIG. 2 hereof and described hereinafter and displayed either on a CRT or similar device or in printed form, stored or transmitted. With plan parameters, incremental investment income, cost of the guaranteed insurability option and periodic management fee, the calculating means is capable of calculating or generating the beginning of year fund value before reduction (BOYFVBR), beginning of year fees (BOYF), beginning of year fund value (BOYFV), beginning of year death benefit (BOYDB), net amount at risk (NAR), cost of insurance rate during insurance phase (COIR), cost of insurance during insurance phase (COI), annual rate of return (ROR), annual investment income (AII) and end of year fund value (EOYFV) of each policy year and corresponding attained age. Thus, actual value and forecast value of the plan in either phase can be calculated, stored and displayed.

The convertible plan models for the fixed ROR and variable ROR are best understood with reference to FIGS. 3 and 4 respectfully. The initial fund deposit or amount, issue age, conversion age and mortality death benefit at date of conversion from the annuity phase to the insurance phase are selected or chosen. This data is entered into the processing means 118 through the keyboard 112 as shown in FIG. 1. Once entered, the computer system generates the various periodic or annual variables of BOYFVBR, BOYF, BOYFV, BOYDB, NAR, COI, AII and EOYFV by applying constants of the agreed upon annual management fee (AMF) as a percentage of the annual beginning fund amount, the COI as determined by the issue age, conversion age and initial mortality death benefit and corridor percentage or required by Section 7702 along with the projected investment income (PII) or actual investment income (AII). The actual investment income will be entered through the keyboard 112. Except for the actual investment income, those values may reside in memory for look-up once the variables are selected.

As shown in FIGS. 3 and 4, the beginning age for the annuity is 60 with a conversion at 15 years or age 75. The initial premium is $1,000,000 for both the fixed and variable rate of return plans.

As shown, the initial beginning of year fund value (BOYFV) of $987,500 is the initial deposit $1,000,000 less the annual management fee (BOYF) which is for example of $12,500 or 1.25 percent of the initial deposit. Thereafter, the annual beginning of year fund value (BOYFV) is the previous annual end of year fund value less the annual management fee (BOYF).

The beginning of the year death benefit (BOYDB) during the annuity phase is equal to the beginning of year fund value (BOYFV). The beginning of year death benefit (BOYDB) is the beginning of the year fund value (BOYFV) multiplied by the cash corridor percentage (CCP) during the insurance phase.

There is no net amount at risk (NAR) during the annuity phase. The net amount at risk (NAR) during the insurance phase is calculated as the difference between the beginning of the year death benefit (BOYDB) and the beginning of the year fund value (BOYFV).

The cost of insurance rate (COIR) during the insurance phase which varies annually is determined by the re-insurer's or insurer's rate maintained in look-up tables or database in the processor 110 derived from predetermined actuarial statistics.

The beginning year cost of insurance (COI) is the net amount at risk (NAR) multiplied by the cost of insurance rate (COI).

The annual investment income (AII) for the fixed rate of return is calculated by multiplying the constant rate of return (ROR) by the beginning of year fund value (BOYFV). The annual investment income (AII) for the variable rate of return is similarly calculated by imputing the variable rate of return (ROR) through the keyboard 112.

The end of year fund value (EOYFV) is calculated as the sum of the beginning of year fund value (BOYFV) and the annual investment income (AII).

As described and illustrated, the values or amounts of the various parameters can be calculated for any particular period and over the span of the fund plan by the processor 110. So calculated, the values can be displayed on the display means 116, printed on the printer 120 and/or transmitted over a communications link 124 to an external or remote terminal.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described.

What is claimed is:

1. A method for providing an irrevocable variable life insurance conversion plan for selecting a predetermined conversion date, selecting an initial mortality death benefit at the predetermined conversion date and purchasing a guaranteed insurability option to guarantee the availability of the mortality death benefit at the predetermined conversion date consisting of purchased mortality insurance and the accelerated cash value whereby once the variable annuity fund is converted to the variable life insurance policy with the mortality death benefit, income is accrued within the life insurance policy until the death of the insured of the life insurance policy at which time the variable death benefit is disbursed to the beneficiary by converting the variable annuity fund to the variable life insurance policy at the predetermined conversion date through the use of a processor or computer system including an input means, a storage means or data base, a calculating means and an output means, said method comprising the steps of: inputting data relating to a variable annuity fund of the predetermined value and the irrevocable variable life insurance conversion plan into the storage means by the input means, entering a plurality of plan parameters including the initial value or amount of the variable annuity fund, the value or amount of the initial mortality death benefit and the date for converting from the annuity phase to the insurance phase, a cost of the guaranteed insurability option and an annual or periodic plan management fee into the data base within the storage means by the input means, periodically calculating a plurality of values including the beginning of year fund value (BOYFV), net amount at risk (NAR), cost of insurance (COI), either the cost of the insurability option during annuity phase or the mortality death benefit cost during life insurance phase, investment income (II), end of year fund value (EOYFV), corridor data or percentage (CP) and total death benefit (TDB) by the calculating means, and generating an output of the plurality of calculated values wherein investment income is accrued within the annuity fund on a tax deferred basis until the predetermined conversion date and then converted to a qualified life insurance policy with a predetermined mortality death and to disburse the death benefit to a beneficiary at the death of the insured of the qualified life insurance policy.

2. The method for converting an annuity fund to a life insurance policy at a predetermined conversion date of claim 1 wherein a computer system generates periodic or annual variables of BOYFV, NAR, EOYFV and TDB by applying constants of said agreed upon annual management fee (AMF) as a percentage of said annual beginning fund amount, said COI as determined by said issue age, conversion age and initial mortality death benefit and corridor percentage along with a projected investment income (PII) or actual investment income (AII).

3. The method for converting an annuity fund to a life insurance policy at a predetermined conversion date of claim 1 wherein the actual investment income is entered into the data base by the input means.

4. The method for converting an annuity fund to a life insurance policy at a predetermined conversion date of claim 1 further includes displaying the plurality of values on a display means.

5. The method for converting an annuity fund to a life insurance policy at a predetermined conversion date of claim 1 wherein the output means includes a printer means to generate a print out from the data base.

6. The method for converting an annuity fund to a life insurance policy at a predetermined conversion date of claim 1 wherein the cost of insurance is calculated by the amount of selected initial death benefit, issue age of person and conversion age of person during the annuity phase from data stored in the data base.

7. The method for converting an annuity fund to a life insurance policy at a predetermined conversion date of claim 6 wherein the TDB is calculated by the calculating means during the insurance phase from data in the data base as equal to the CP of the BOYFV or the selected initial death benefit which ever is greater.

* * * * *